US012782170B2

(12) United States Patent
Skoglund

(10) Patent No.: US 12,782,170 B2
(45) Date of Patent: Nov. 3, 2026

(54) AIRCRAFT SENSOR WITH VENTED BORES IN A STRUT

(71) Applicant: Rosemount Aerospace Inc., Burnsville, MN (US)

(72) Inventor: Jason L. Skoglund, New Hope, MN (US)

(73) Assignee: Rosemount Aerospace Inc. (HSC), Burnsville, MN (US)

( * ) Notice: Subject to any disclaimer, the term of this patent is extended or adjusted under 35 U.S.C. 154(b) by 305 days.

(21) Appl. No.: 18/474,759

(22) Filed: Sep. 26, 2023

(65) Prior Publication Data

US 2025/0100709 A1 Mar. 27, 2025

(51) Int. Cl.
*G01D 11/24* (2006.01)
*B64D 43/00* (2006.01)

(52) U.S. Cl.
CPC ........... *G01D 11/245* (2013.01); *B64D 43/00* (2013.01)

(58) Field of Classification Search
CPC ....... B64D 43/00; B64D 43/02; G01D 11/245
See application file for complete search history.

(56) References Cited

U.S. PATENT DOCUMENTS

| | | | |
|---|---|---|---|
| 3,341,835 A | 9/1967 | Werner et al. | |
| 5,466,067 A * | 11/1995 | Hagen | G01P 5/165 374/138 |
| 5,601,254 A | 2/1997 | Ortiz et al. | |
| 5,628,565 A | 5/1997 | Hagen et al. | |
| 5,653,538 A | 8/1997 | Phillips | |
| 11,655,726 B2 | 5/2023 | Holl et al. | |
| 11,662,235 B2 | 5/2023 | Isebrand et al. | |
| 2019/0302140 A1* | 10/2019 | Pusheck | H01R 13/6683 |
| 2021/0270146 A1 | 9/2021 | Holl et al. | |
| 2022/0381627 A1* | 12/2022 | Kim | B64D 15/20 |
| 2023/0106016 A1 | 4/2023 | Isebrand et al. | |

FOREIGN PATENT DOCUMENTS

WO 03002410 A1 1/2003

OTHER PUBLICATIONS

Jackson, D., Liao, J., and Severson, J., "An Assessment of Goodrich Ice Detector Performance in Various Icing Conditions," SAE Technical Paper 2003-01-2115, 2003, https://doi.org/10.4271/2003-01-2115.

Extended European Search Report dated Feb. 18, 2025, for corresponding European Patent Application No. 24202039.4. 10 pgs.

* cited by examiner

*Primary Examiner* — Nathaniel J Kolb
(74) *Attorney, Agent, or Firm* — Kinney & Lange

(57) ABSTRACT

An aircraft sensor includes a housing, a strut connected to and extending from a top of the housing, and a probe extending from the strut. The strut includes a flange extending radially outward from a bottom portion of the strut and a body extending from a top of the flange. The strut also includes a bore extending into the strut body and having a closed end positioned in the body. The strut also includes a vent shaft fluidly connected to the bore and including an outlet.

16 Claims, 6 Drawing Sheets

AIRCRAFT SENSOR WITH VENTED BORES IN A STRUT

BACKGROUND

Air data sensors can utilize cartridge heaters, magnets, thermostats, or other sensor components that are secured into bores in a strut of the sensor with adhesives including epoxy. The bores are typically tight and there is very little gap between the sensor component and the bore wall. When these sensor components are inserted into the bores in the strut, gas becomes trapped in the bottom of the bore, which can then cause the sensor component to push out during adhesive curing processes. Struts with sensor components which have pushed out of their respective bores require expensive rework.

SUMMARY

An aircraft sensor includes a housing, a strut connected to and extending from a top of the housing, and a probe extending from the strut. The strut includes a flange extending radially outward from a bottom portion of the strut and a body extending from a top of the flange. The strut also includes a bore extending into the strut body and having a closed end positioned in the body. The strut also includes a vent shaft fluidly connected to the bore and including an outlet.

A method of manufacturing an air data sensor includes additively manufacturing a strut for the air data sensor. The strut comprises a bore and a vent shaft fluidly connected to the bore. The method also includes coating a device with an adhesive. The method also includes positioning the device into the bore. The method also includes evacuating air from the bore through the vent shaft as the device is inserted into the bore. The method also includes curing the adhesive.

DETAILED DESCRIPTION

Figure 1:
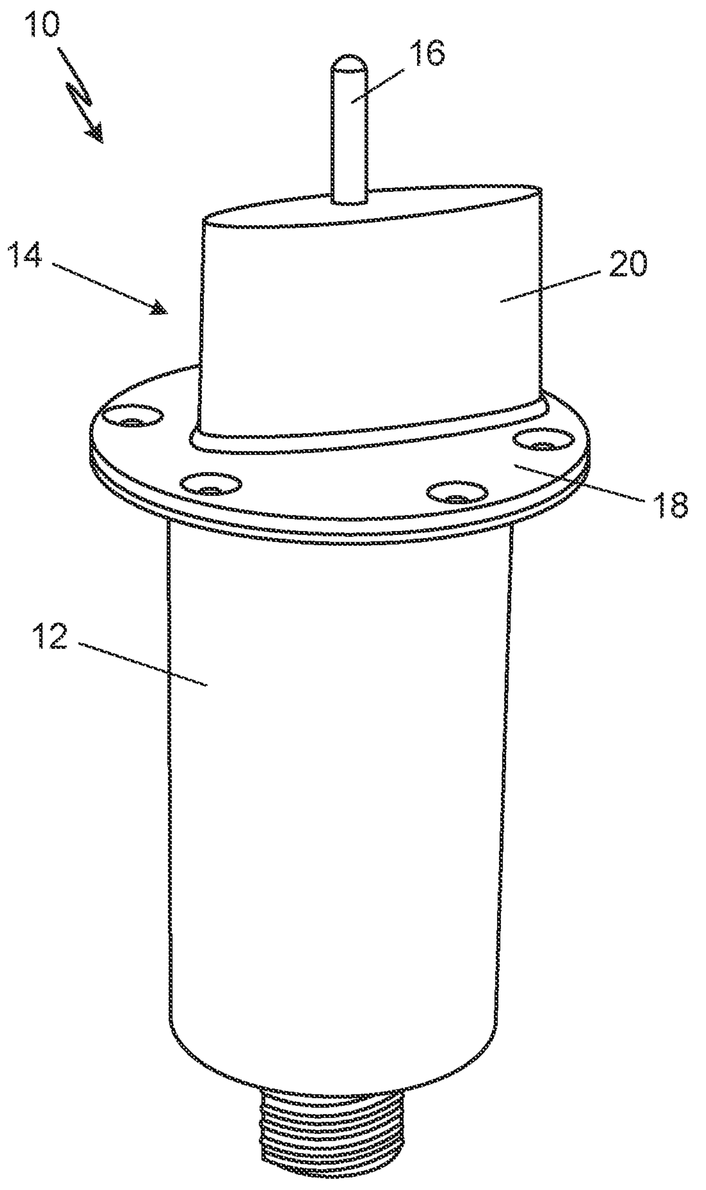
FIG. 1 is a perspective view of an air data sensor.

FIG. 1 is a perspective view of air data sensor 10. Air data sensor 10 includes electronics housing 12, strut 14, and probe 16. Strut 14 includes flange 18 and body 20. Air data sensor 10 is an ice detector.

Air data sensor 10 has electronics housing 12 at a bottom portion, as shown in FIG. 1. Strut 14 is a monolithic piece attached to a top portion of electronics housing 12. Probe 16 extends from a top portion of strut 14. Probe 16 is a hollow tube with a rounded top and is mounted into strut 14 at a middle point (or node) such that an equal amount of probe 16 is inside of strut 14 as outside. Flange 18 is a bottom portion of strut 14 and extends radially outwards. Body 20 extends from flange 18 opposite where electronics housing 12 meets strut 14. Body 20 has an airfoil shape in air data sensor 10. Body 20 can alternatively have other shapes and configurations, depending on the type of air data sensor utilizing strut 14. In a preferred embodiment of strut 14, body 20 is free from exterior joints (or "fill spots") from filling holes used to aid assembling air data sensor 10 in the top or sides.

Air data sensor 10 is mounted onto the aircraft so that electronics housing 12 is inside the aircraft and strut 14 and probe 16 extend into the airstream moving around the aircraft. Electronics housing 12 holds electrical components, including circuit boards and wiring, and connects air data sensor 10 to an air data sensing system installed in the aircraft. Flange 18 is a mounting flange designed to bolt into and lay flush against a skin of the aircraft. Strut 14 holds probe 16 into the airstream moving around the aircraft. Air data sensor 10 is mounted onto the aircraft such that the airfoil shape of body 20 reduces drag on the aircraft.

Air data sensor 10 is an ice detector which uses the principle of magnetostriction to measure ice accretion on probe 16. Ice accretes on probe 16, which vibrates to measure changes in mass as ice accretes. Electronics, including an oscillator circuit, in electronics housing 12 measure changes in the frequency of vibration in probe 16 from the added mass of ice on probe 16. When the electronics sense ice has accreted to a predetermined mass, the electronics activate a deicing system in the aircraft to remove accreted ice from the wings, skin, rotors, or other components of the aircraft. The electronics also activate a probe heater (shown in FIG. 2) to heat probe 16 and remove the accreted ice. The function of air data sensor 10 will be discussed in more detail in relation to FIG. 2 below.

Air data sensor 10 senses ice accretion on an aircraft and activates anti-icing measures. Flange 18 is designed to fit flush into the skin of the aircraft and minimize drag on the aircraft caused by air data sensor 10. The airfoil shape of body 20 similarly reduces drag. Strut 14 and probe 16 are exposed to water, ice, and strong external forces during flight. Further, air data sensor 10 is designed to be repeatedly frozen over and thawed. In a preferred embodiment, strut 14 does not include fill spots used to assemble air data sensor 10. This decreases spot failure caused by exposing fill spots to air and ice in the cyclic freezes and thaws utilized by air data sensor 10. Excluding fill spots increases the life of strut 14 and air data sensor 10.

Figure 2:
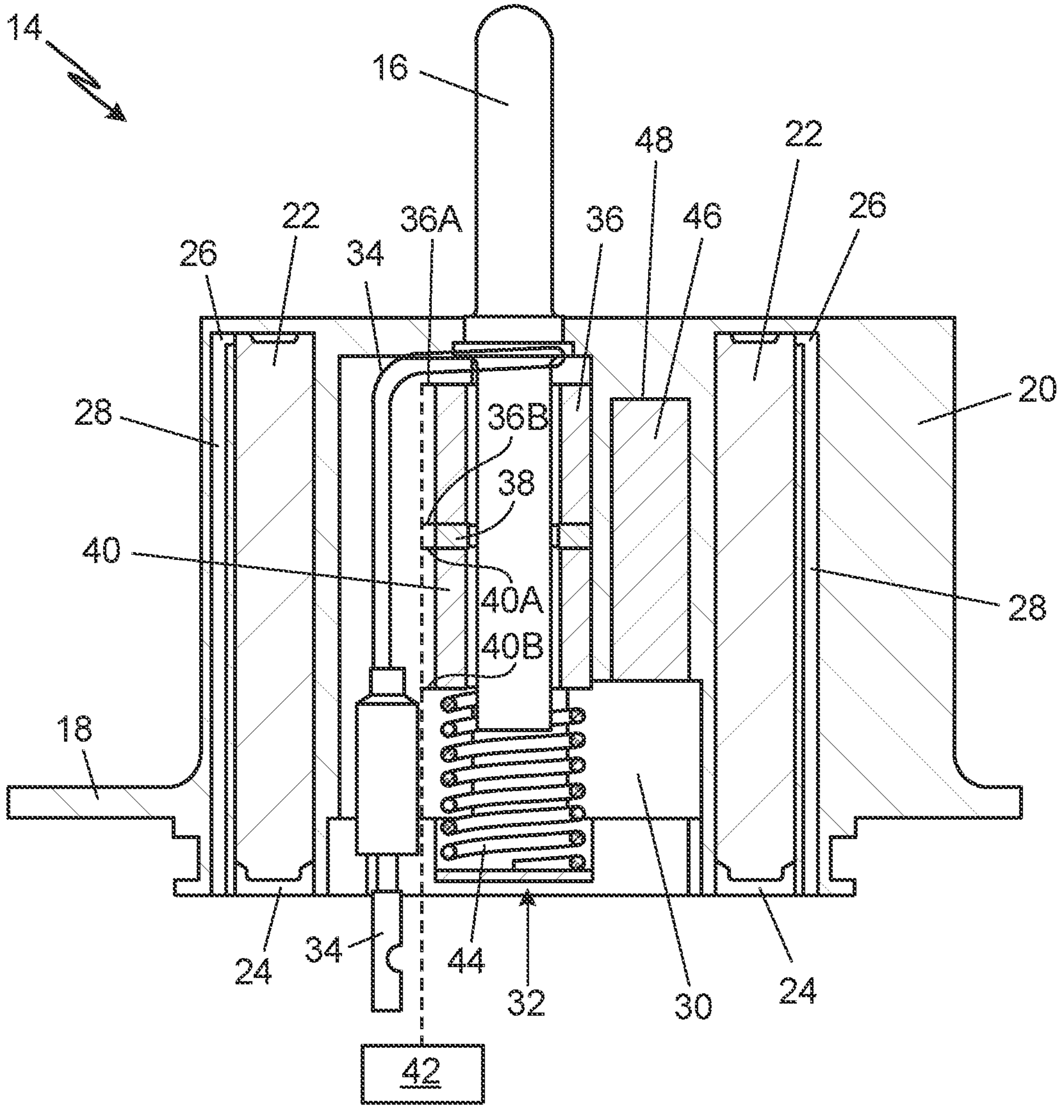
FIG. 2 is a cross-sectional view of a first embodiment of a strut of the air data sensor including heaters.

FIG. 2 is a cross-sectional view of a first embodiment of strut 14 including heaters 22. FIG. 2 shows strut 14 and probe 16. Strut 14 includes flange 18 and body 20. Strut 14 also includes heaters 22, bores 24, drains 26, vent shafts 28, and cavity 30. Cavity 30 houses sensing device 32 and probe heater 34. Sensing device 32 includes probe 16, drive coil 36 with first electrical connection 36A and second electrical connection 36B, spacer 38, feedback coil 40 with first electrical connection 40A and second electrical connection 40B, oscillator circuit 42, spring 44, and magnet 46 in magnet bore 48.

A node, or midpoint, of probe 16 is mounted in a top of strut 14 such that half of probe 16 is external to strut 14 and half of probe 16 is within strut 14. Flange 18 is a bottom portion of strut 14 and body 20 extends from flange 18. Flange 18 extends radially outwards from body 20 and has a generally circular shape. Body 20 has an airfoil shape in this embodiment.

Heaters 22 are positioned in bores 24 in body 20 of strut 14. In the embodiment shown in FIG. 2, heaters 22 are cartridge heaters. Heaters 22 are typically cylindrical, however can be other shapes. Bores 24 are positioned in body 20 near a leading edge and a trailing edge of the airfoil shape.

Bores 24 each have an open end near a bottom of strut 14 and a closed end near a top of body 20. The closed ends of bores 24 are positioned within strut 14. Bores 24 have cross-sections which match the shape of heaters 22. For example, in the embodiment shown in FIG. 2, heaters 22 and bores 24 are cylindrical. Bores 24 have a size and shape which creates an air-tight fit around heaters 22. The open and closed ends of bores 24 will be discussed in more detail in relation to FIGS. 3A-3B. Two bores 24 are shown in the embodiment in FIG. 2, however, the number, diameter, and placement of bores 24 can vary based on the shape and size of strut 14 and the number of heaters 22 or other sensor components in strut 14. Heaters 22 are held into bores 24 by adhesive, for example, epoxy.

Drains 26 are fluidly connected to and extend outward from bores 24. Drains 26 fluidly connect to bores 24 adjacent to a closed end of bores 24 positioned near a top of body 20. Drains 26 are approximately perpendicular to bores 24 in FIG. 2. An approximately perpendicular angle is between 89° and 91°, and is more preferably between 89.5° and 90.5°. In alternate embodiments, drains 26 can extend at any angle from bores 24 or be excluded from strut 14. Drains 26 are straight in strut 14, however can be curved or include turns in other embodiments depending on the configuration of heaters 22 and other sensor components in strut 14. Vent shafts 28 are fluidly connected to and extend from drains 26 toward a bottom of strut 14. Vent shafts 28 are aligned with or approximately parallel to bores 24 and have smaller diameters than bores 24 in the embodiment shown in FIG. 2. Vent shafts 28 are approximately straight in the embodiment of FIG. 2, however can include curves or turns to route around other components or devices in strut 14, as will be discussed in relation to FIGS. 3A-3B. Vent shafts 28 have an open end at a bottom of strut 14 through flange 18 and adjacent to the open ends of bores 24. Vent shafts 28 can also open into cavity 30. In alternate embodiments, vent shafts 28 can connect directly to bores 24. For example, a vent shaft 28 can extend at an angle between a connection with a bore 24 and the bottom of strut 14. Bores 24, in alternative embodiments, can include multiple drains 26 and vent shafts 28. Vent shafts 28 open to a bottom of strut 14 such that the open ends of vent shafts 28 will be positioned in electronics housing 12 (shown in FIG. 1) when air data sensor 10 (shown in FIG. 1) is assembled.

In the embodiment shown in FIG. 2, heaters 22 are cartridge heaters. Heaters 22 warm and deice body 20 of strut 14, which extends into an airstream moving around the aircraft. Heaters 22 can also aid in deicing probe 16. Heaters 22 connect to electronics systems in electronics housing 12 to power on and off as necessary for deicing strut 14 and probe 16. Heaters 22 have an air-tight fit in bore 24 to increase heat conduction into body 20 of strut 14. Heaters 22 fit into bores 24 such that a top of each heater 22 contacts a closed end of bore 24.

Drains 26 and vent shafts 28 allow for air to escape bores 24 as heaters 22 are inserted during assembly of strut 14. The tight fit between one heater 22 and its respective bore 24 does not allow air to escape through the open end of bore 24. Drains 26 and vent shafts 28 allow air to escape from the closed ends of bores 24, which allows heaters 22 to be inserted into bores 24 such that a top of heaters 22 contact a top of bores 24. Movement of air out of drains 26 and vent shafts 28 will be discussed in more detail below with respect to FIGS. 4-5.

Drains 26 and vent shafts 28 allow air to escape from bores 24 as heaters 22 are inserted during assembly of strut 14. When a bore 24 does not include a vent shaft 28 and/or a drain 26, air is trapped in the bore 24 when a heater 22 covered in adhesive (for example, epoxy) is inserted into the bore 24. The trapped air expands during adhesive curing procedures and causes the heater 22 to push out of the bore 24. A pushed-out heater 22 operates sub optimally and can require expensive and time-consuming rework. Bores 24 with vent shafts 28 and/or drains 26 allow for passive removal of air trapped in bores 24 by heaters 22 being inserted, reducing the complexity and cost of assembly strut 14.

Alternative methods of assembly, including drilling holes through a side or the top of body 20 of strut 14, require extra process steps including, for example, creating and filling the holes, which create fill holes. Such fill holes can deteriorate and cause failure of strut 14 from exposure to air, water, and ice. Drains 26 and vent shafts 28 are positioned such that an outside of body 20 above flange 18 does not include fill holes and elongate the life of strut 14.

Cavity 30 is near a middle of body 20 between bores 24 holding heaters 22. Sensing device 32 and probe heater 34 are positioned in cavity 30. Sensing device 32 has probe 16 as a central member. Other components of sensing device 32 are positioned around or adjacent to probe 16. Probe heater 34 enters probe 16 below where probe 16 meets strut 14 (or the node) and is brazed into the inside of the probe 16 around the portion external to strut 14 and extending into the airstream. A remainder of probe heater 34 extends through cavity, below strut 14, and connects to electrical connections in electronics housing 12 (shown in FIG. 1).

Sensing device 32 includes probe 16, drive coil 36 with first electrical connection 36A and second electrical connection 36B, spacer 38, feedback coil 40 with first electrical connection 40A and second electrical connection 40B, oscillator circuit 42, spring 44, and magnet 46 in magnet bore 48. Probe 16 extends through cavity 30 and a top of strut 14 to an exterior of strut 14. Drive coil 36 is wound around probe 16 near the top of cavity 30. First electrical connection 36A is near a top of drive coil 36 and second electrical connection 36B is near a bottom of drive coil 36. First electrical connection 36A and second electrical connection 36B are points on drive coil 36 where other electronic components connect. Spacer 38 is between and separates drive coil 36 and feedback coil 40. Feedback coil 40 is wound around probe 16 below space 38 and includes first electrical connection 40A near a top and second electrical connection 40B near a bottom of feedback coil 40. Each of first electrical connection 36A, second electrical connection 36B, first electrical connection 40A, and second electrical connection 40B are connected to oscillator circuit 42. Oscillator circuit 42 is on a circuit board within electronics housing 12 (shown in FIG. 1). The connections to oscillator circuit 42 are represented schematically in FIG. 2 by a dotted line. Each electrical connection 36A, 36B, 40A, and 40B connect to a wire. For example, a first wire connects to first electrical connection 36A, a second wire connects to second electrical connection 36B, a third wire connects to first electrical connection 40A, and a fourth wire connects to second electrical connection 40B. Each of the four wires can connect directly to oscillator circuit 42 or to a cartridge that plugs into a receptacle on the circuit board holding oscillator circuit 42. Spring 44 is at a bottom of probe 16 and holds drive coil 36, spacer 38, and feedback coil 40 in place on probe 16. Magnet 46 and magnet bore 48 are adjacent to drive coil 36 and feedback coil 40. Magnet 46 is in magnet bore 48 and can be a permanent magnet or an electromagnet. Magnet bore 48 is in body 20 of strut 14.

Sensing device 32 uses the principle of magnetostriction to measure ice accretion on probe 16. Magnetostriction occurs when a magnetic field is applied to a material and the material expands or contracts in response. Oscillator circuit 42 supplies an alternating current through drive coil 36 (via first electrical connection 36A and second electrical connection 36B) to set up an alternating magnetic field around probe 16. The alternating magnetic field causes axial expansion and contraction (or resonance) in probe 16. Voltage develops in feedback coil 40 from the electromagnetic field moving through probe 16. The voltage moves from feedback coil 40 (via first electrical connections 40A and second electrical connections 40B) to oscillator circuit 42. Magnet 46 is a polarizing magnet to start and continue resonance in probe 16.

The resonant frequency of probe 16 is tuned to resonate in dry air at around 40 KHz. The resonant frequency of probe 16 is dependent on its mass. As probe 16 accretes ice, the frequency through probe 16 shifts, indicating additional mass. Once a specified frequency shift is reached, oscillator circuit 42 activates an ice signal which turns on probe heater 34 to melt accreted ice from probe 16 and other aircraft de-icing systems connected to air data sensor 10 (shown in FIG. 1).

Figure 3A:
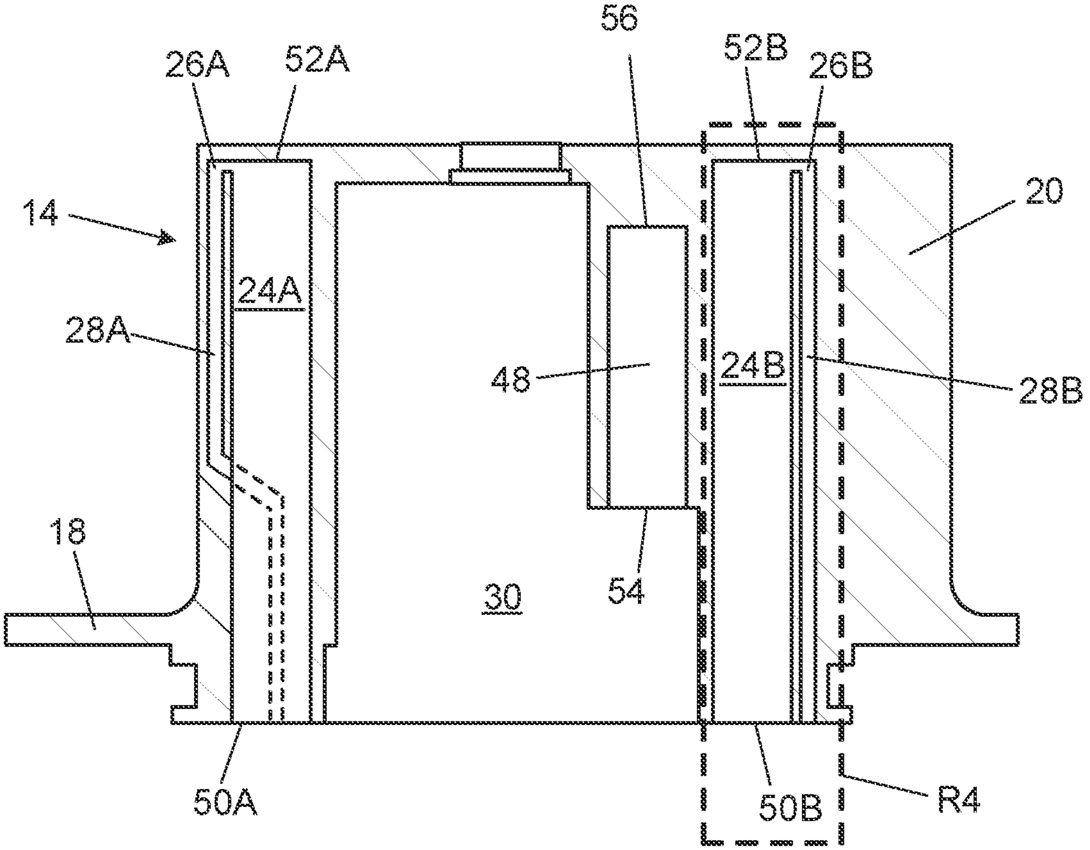
FIG. 3A is a cross-sectional view of a second embodiment of the strut with the heaters removed.
Figure 3B:
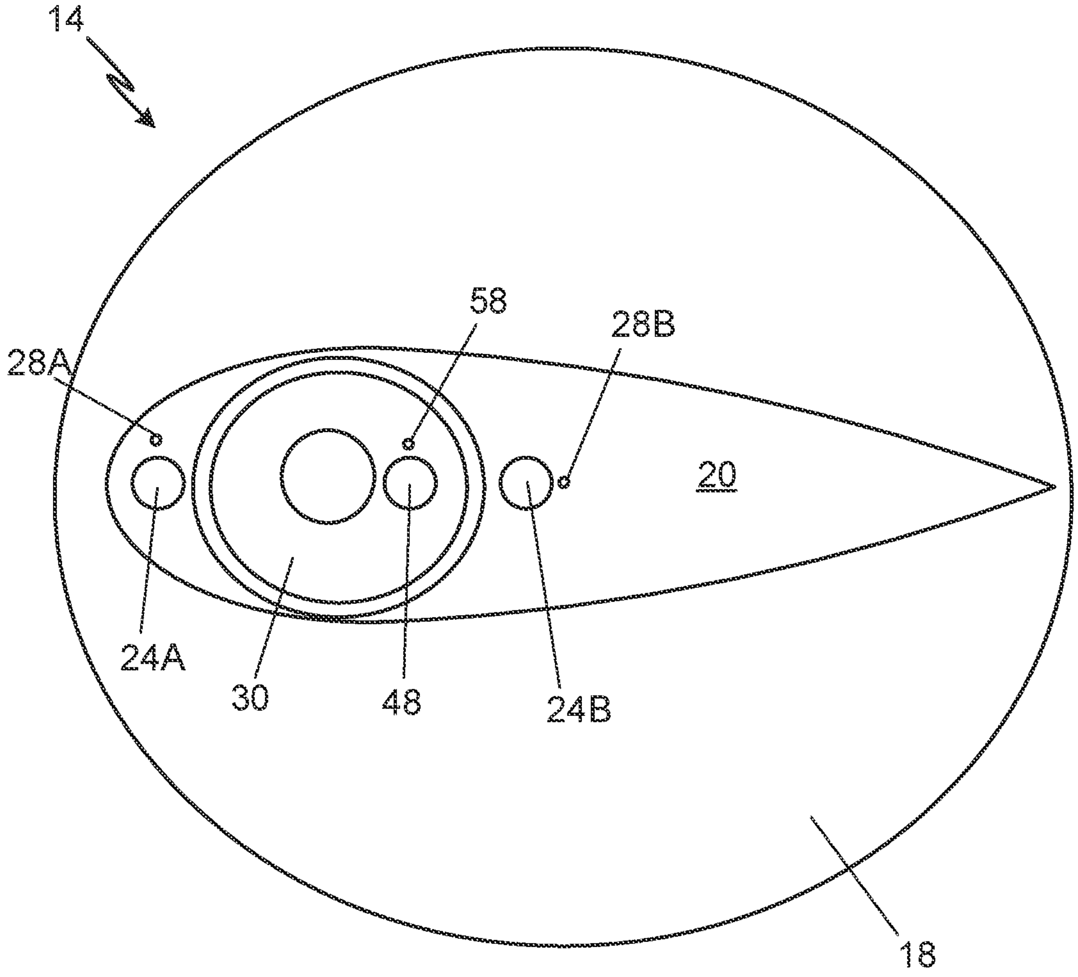
FIG. 3B is a bottom view of the strut with the heaters removed.

FIG. 3A is a cross-sectional view of a second embodiment of strut 14 without heaters 22 (shown in FIG. 2). FIG. 3B is a bottom view of the second embodiment of strut 14 without heaters 22. FIGS. 3A-3B will be discussed together. Strut 14 includes flange 18 and body 20 with bore first bore 24A, second bore 24B, first drain 26A (shown in FIG. 3A), second drain 26B (shown in FIG. 3A), first vent shaft 28A, second vent shaft 28B, cavity 30, and magnet bore 48. First bore 24A includes first open end 50A (shown in FIG. 3A) and first closed end 52A (shown in FIG. 3A). Second bore 24B includes second open end 50B (shown in FIG. 3A) and second closed end 52B (shown in FIG. 3A). Magnet bore 48 includes open end 54 (shown in FIG. 3A), closed end 56 (shown in FIG. 3A), and magnet vent shaft 58 (shown in FIG. 3B). FIG. 3A also includes rectangle R4 around second bore 24B, second drain 26B, and second vent shaft 28B, which will be discussed in relation to FIG. 4.

The embodiment of strut 14 shown in FIGS. 3A-3B is configured like the first embodiment of strut 14 discussed in relation to FIG. 2, including flange 18, body 20, cavity 30, and magnet bore 48. The embodiment of strut 14 shown in FIGS. 3A-3B has first bore 24A, first drain 26A, and first vent shaft 28A on a left side of strut 14 and second bore 24B, second drain 26B, and second vent shaft 28B on a right side. First vent shaft 28A turns and second vent shaft 28B is straight. First vent shaft 28A is turned toward a middle of strut 14 to increase the thickness of material between first vent shaft 28A and an exterior of strut 14. Turns can also be incorporated, for example, to avoid other components in strut 14. Alternatively, first vent shaft 28A and/or second vent shaft 28B can include curves, turns, and straight portions alone or in combination so long as first bore 24A and second bore 24B fluidly connect to an exterior of strut 14 through a bottom of strut 14 through flange 18. First vent shaft 28A is an example of how strut 14 can be flexibly designed for a specific type of air data sensor with varying components and space limitations.

First bore 24A includes first open end 50A and first closed end 52A. Second bore 24B includes second open end 50B and second closed end 52B. First open end 50A and second open end 50B are positioned in a bottom of strut 14 near a bottom of FIG. 3A. First closed end 52A and second closed end 52B are near a top of strut 14. First closed end 52A and second closed end 52B are positioned in body 20 so a top of strut 14 has a solid, continuous outer surface. First drain 26A fluidly connects to first bore 24A adjacent to first closed end 52A. Second drain 26B fluidly connects to second bore 24B adjacent to second closed end 52B to maximize air removal during insertion of heaters 22. Sides of first drain 26A and second drain 26B are positioned fully in body 20 of strut 14. Both first vent shaft 28A and second vent shaft 28B have a first end connected to first drain 26A or second drain 26B, respectively, and a second, open end at a bottom of strut 14. The open end of first vent shaft 28A is adjacent to the first open end 50A of first bore 24A. The open end of second vent shaft 28B is adjacent to second open end 50B of second bore 24B. The closed ends and sides of both first vent shaft 28A and second vent shaft 28B are positioned in strut 14. First bore 24A, second bore 24B, first drain 26A, second drain 26B, first vent shaft 28A, and second vent shaft 28B are positioned in strut 14 such that the sides and top of strut 14 have a continuous closed outer surface.

Magnet bore 48 includes open end 54, closed end 56, and magnet vent shaft 58. Open end 54 is a lower portion of magnet bore 48 open to cavity 30 of strut 14. Closed end 56 is a top of magnet bore 48 and is positioned in body 20 of strut 14. Magnet vent shaft 58 is fluidly connected to magnet bore 48 near closed end 56 by a drain which connects magnet bore 48 and magnet vent shaft 58. The drain for magnet bore 48 can be configured similarly to first drain 26A and second drain 26B in that it connects to magnet bore 48 adjacent to closed end 56, is approximately perpendicular to magnet bore 48 and magnet vent shaft 58 and connects to a closed end of magnet vent shaft 58 positioned in strut 14. Magnet vent shaft 58 has a smaller diameter than magnet bore 48 and is positioned adjacent to magnet bore 48. However, magnet vent shaft 58 can include turns or curves. Magnet vent shaft 58 is aligned with or approximately parallel to magnet bore 48. Magnet vent shaft 58 operates similarly to first vent shaft 28A and second vent shaft 28B. Magnet 46 (shown in FIG. 2) fits tightly into magnet bore 48. As magnet 46 is inserted into magnet bore 48, air is forced through magnet vent shaft 58, which decreases trapped air in magnet bore 48 and reduces the likelihood of magnet 46 being forced out of magnet bore 48 by air expansion during curing and heat-treating processes for strut 14.

Strut 14 can be formed by additive manufacturing techniques including 3-D printing, powder bed fusion, and directed energy deposition. Additive manufacturing techniques allow for forming relatively small-diameter bores including first bore 24A, second bore 24B, and magnet bore 48. Additive manufacturing techniques also allow for thin walls to be built between first bore 24A, second bore 24B, first vent shaft 28A, second vent shaft 28B, cavity 30, magnet bore 48, and magnet vent shaft 58, as necessary, so the structures can be placed closely together in body 20. Casting strut 14 is difficult because first bore 24A, second bore 24B, first vent shaft 28A, second vent shaft 28B, cavity 30, magnet bore 48, and magnet vent shaft 58 have small diameters and are positioned closely together and walls between these structures are thin. Air bubbles developed during casting can cause breakthroughs in the walls, which reduce the structural stability and thermal conductivity properties of strut 14. Machining and drilling techniques are also less desirable to manufacture strut 14 due to the small diameters of first bore 24A, second bore 24B, first vent shaft 28A, second vent shaft 28B, cavity 30, magnet bore 48, and magnet vent shaft 58. Further, machining first drain 26A, second drain 26B, and the magnet drain is difficult because of their approximately parallel placement to a top of strut 14. Further, using additive manufacturing also allows first vent shaft 28A to be designed with turns, curves, spirals, or other configurations. This allows for flexible placement of first vent shaft 28A, or other vent shafts (for example, second vent shaft 28B or magnet vent shaft 58) to meet spacing and design needs.

Utilizing first drain 26A, second drain 26B, first vent shaft 28A, and second vent shaft 28B helps keep heaters 22 properly positioned in strut 14 for optimal performance. First drain 26A, second drain 26B, first vent shaft 28A, and second vent shaft 28B allow for air to escape from first bore 24A and second bore 24B, respectively, as heaters 22 are inserted. Less air in first bore 24A and second bore 24B trapped by heaters 22 lowers the incidence of heaters 22 pushing out of first bore 24A and second bore 24B during an epoxy cure process. Push out reduces performance of heaters 22 in strut 14 including suboptimal heat flux through strut 14 from heaters 22. Push out can also cause costly reworking to remove and replace heaters 22 in first bore 24A and second bore 24B. Similarly, magnet vent shaft 58 and the drain between magnet bore 48 and magnet vent shaft 58 helps keep magnet 46 properly positioned in strut 14. Having first closed end 52A of first bore 24A, second closed end 52B of second bore 24B, first drain 26A, second drain 26B, and the sides of both first vent shaft 28A and second vent shaft 28B positioned within body 20 of strut 14 reduces fill spots in an outer surface of strut 14.

An alternative manufacturing process for strut 14 could include drilling small-diameter bores in a top of strut 14 through first closed end 52A of first bore 24A or second closed end 52B of second bore 24B and then filling the small-diameter bores after placement of heater 22. This process increases the number of processing steps and time it takes to assemble strut 14. This process also creates fill spots on an outer surface of body 20, which can fail during use of strut 14 from exposure to water, ice, and air.

Figure 4:
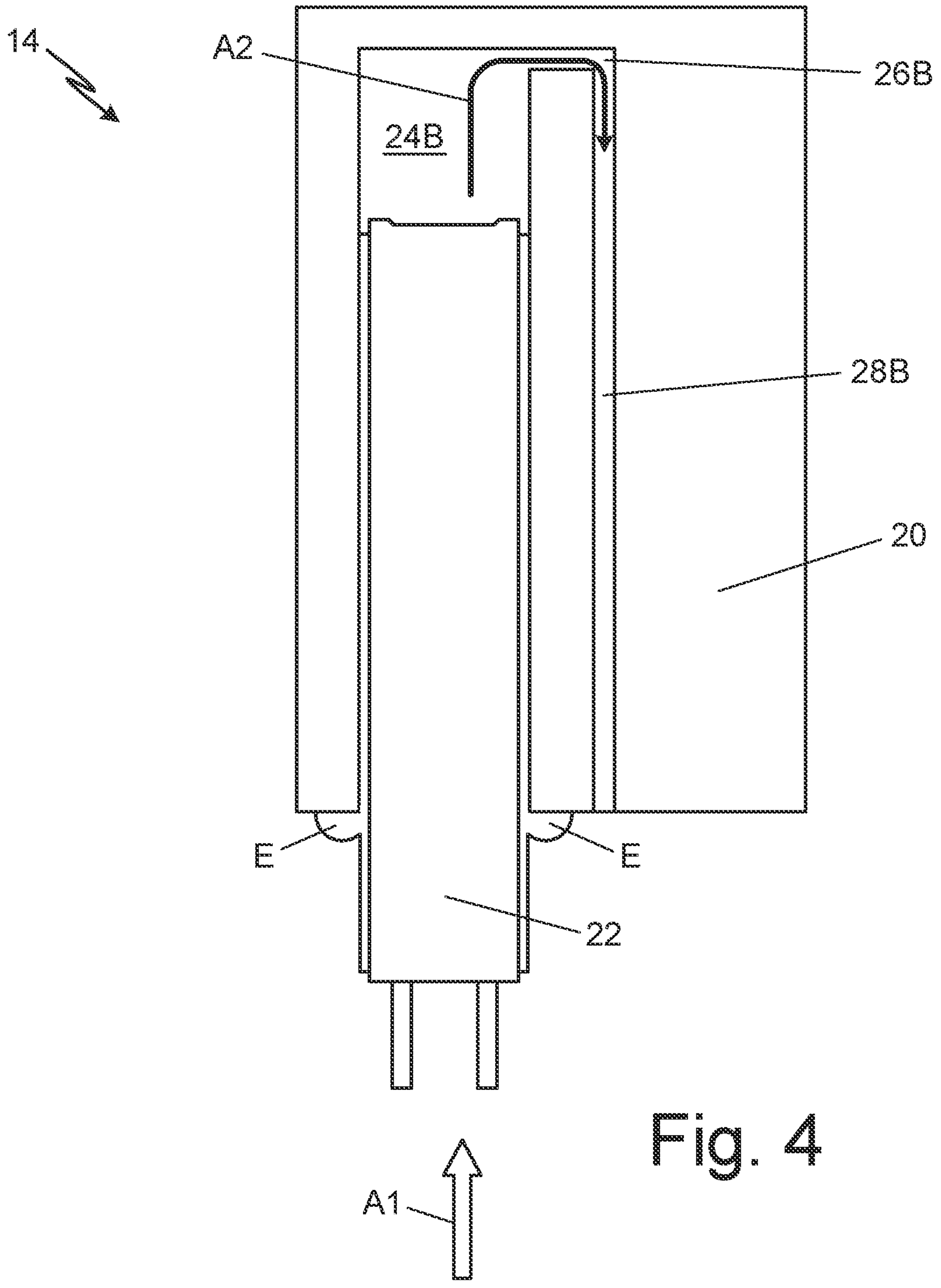
FIG. 4 is a schematic view of the heater being inserted in the strut.

FIG. 4 is a schematic view of heater 22 being inserted into strut 14. FIG. 4 is a close view of second bore 24B, second drain 26B, and second vent shaft 28B indicated by rectangle R4 of FIG. 3A. FIG. 4 also includes strut 14 includes body 20, epoxy E, Arrow A1 near a bottom of FIG. 4 and arrow A2 near a top of FIG. 4.

In FIG. 4, heater 22 is being inserted into second bore 24B, as indicated by arrow A1. Heater 22 has epoxy E coating its sides. Heater 22 and second bore 24B are approximately the same size and shape, so there is little gap between heater 22 and second bore 24B during and after assembly. Heater 22 can be, for example, a cartridge heater for strut 14. Heater 22 has a tight fit in second bore 24B to increase heat transfer from heater 22 into strut 14. The tight fit between heater 22 and second bore 24B along with the applied epoxy E creates an approximately air-tight seal at an open end (for example, second open end 50B in FIGS. 3A-3B) of second bore 24B. Air within second bore 24B before insertion of heater 22 and epoxy E can follow arrow A2 out of second drain 26B and second vent shaft 28B. Second drain 26B is positioned near a closed end (for example, second closed end 52B shown in FIG. 3A) of second bore 24B to allow a maximal amount of air to escape as heater 22 is inserted into second bore 24B.

Second drain 26B and second vent shaft 28B allow air to escape from second bore 24B as heater 22 is inserted into strut 14. Removing air from second bore 24B as heater 22 decreases the likelihood of heater 22 pushing out of second bore 24B during curing epoxy E. Strut 14 is heated to cure epoxy E to hold heaters 22 in strut 14. Heating expands air trapped in second bore 24B and potentially pushes heater 22 out of second bore 24B. Heaters 22 pushed out of second bore 24B can operate sub optimally, including lower heat flux through strut 14. Second vent shaft 28B and second drain 26B reduce air trapped in second bore 24B and decreases the probability of heater 22 pushing out of strut 14. This reduces waste from pushed-out heaters 22, which can require expensive retooling to repair.

Positioning heater 22 in second bore 24B having second drain 26B and second vent shaft 28B is also a passive way of removing air from second bore 24B as heater 22 is inserted. Current methods of inserting heater 22 into a bore (for example, second bore 24B) without a drain (for example, second drain 26B) or a vent shaft (for example, second vent shaft 28B) can include complex maneuvering or drilling vents through a top or side of strut 14. Complex maneuvering increases production time. Drilling vents also increase production time because the vents need to be closed. However, even closing vents creates fill spots which weaken strut 14 and increase failure during the life of the strut 14. Second bore 24B having second drain 26B and second vent shaft 28B prolong the life of strut 14. While discussion in FIG. 4 relates to second bore 24B, the same principles and benefits apply to first bore 24A (shown in FIGS. 3A-3B) and magnet bore 48 (shown in FIGS. 3A-3B).

Figure 5:
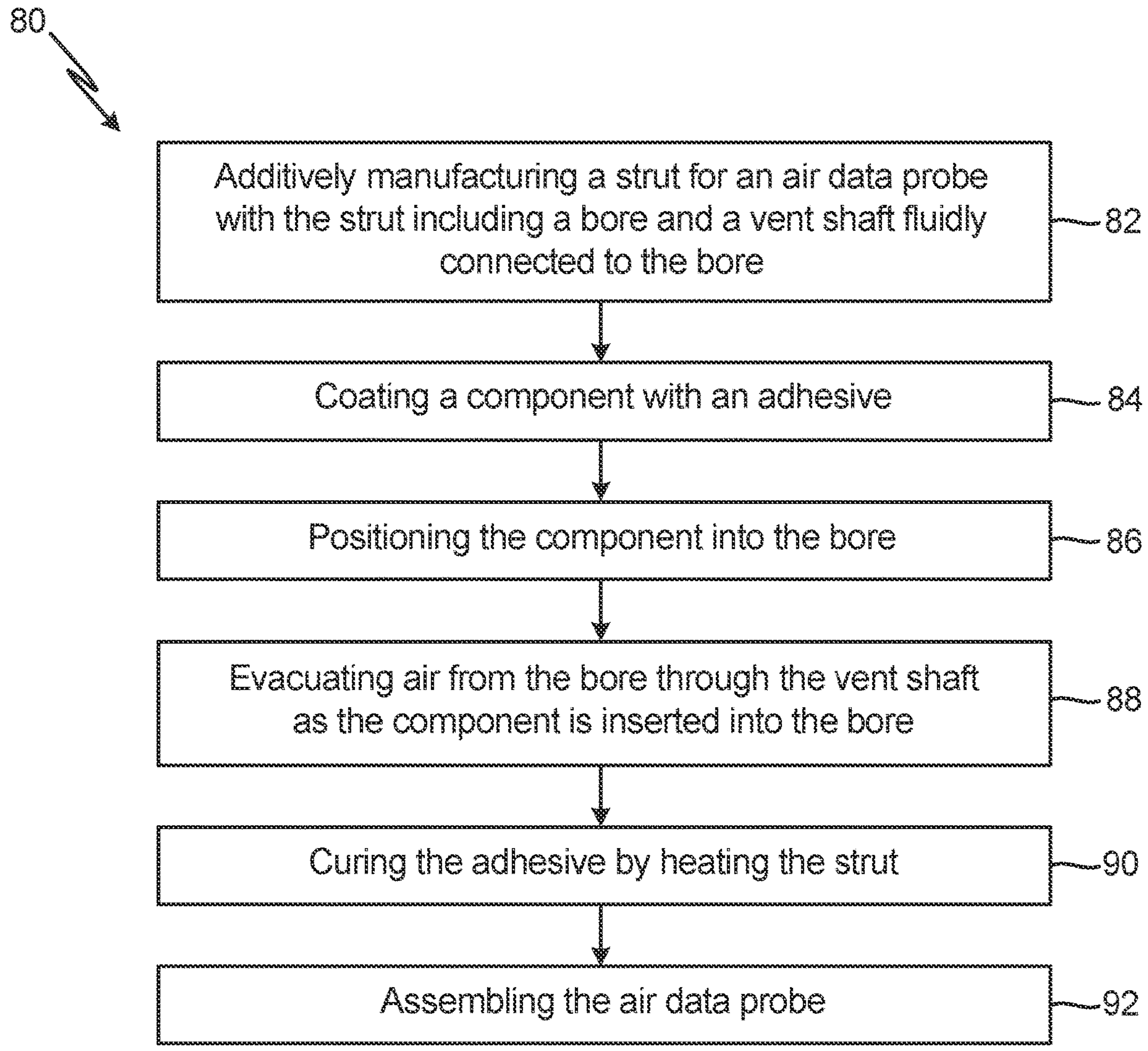
FIG. 5 is a flow chart showing a method for manufacturing an air data sensor.

FIG. 5 is a flow chart showing method 80 for manufacturing air data sensor 10. Method 80 includes steps 82-92. Method 80 will be described in relation to air data sensor 10 as described above in relation to FIGS. 1-2 including utilizing reference numerals. Method 80 can also be used to manufacture other types of air data sensors.

Step 82 includes additively manufacturing strut 14 for air data sensor 10 with strut 14 including bore 24 and vent shaft 28 fluidly connected to bore 24. As shown in FIG. 3A, for example, vent shaft 28 is fluidly connected to bore 24 by drain 26, which is positioned perpendicular to both bore 24 and vent shaft 28. Manufacturing strut 14 with drain 26 is difficult using machining because of the small diameter and the short length of drain 26 and its perpendicular placement. Further, casting strut 14 is difficult because of the small diameters of bores 24 and vent shafts 28 as well as their relatively close placement. Air bubbles and voids are likely to form during casting, which reduces the ability of a heater (for example, heater 22 shown in FIG. 2) to transfer heat as designed. Additive manufacturing techniques include 3-D printing, powder bed fusion, and directed energy deposition. Additive manufacturing techniques can be used to create bores 24, drains 26, and vent shafts 28 with small diameters, perpendicular connections, complex geometries, and close placements. Additive manufacturing also reduces issues with breaking solid portions of body 20 between vent shaft 28 and bore 24.

Step 84 includes coating heater 22 with an adhesive. The adhesive can be, for example, epoxy E, as shown in FIG. 4. Heater 22 is one type of sensor component that can be placed in strut 14. Step 84 can also be used to place magnet 48 or other sensor components into a bore in strut 14. The adhesive is used to keep heater 22 in bore 24 during the life of air data sensor 10 and promote operation of heater 22. For example, when heater 22 is a cartridge heater, the adhesive will promote thermal conduction.

Step 86 includes positioning heater 22 into bore 24. Step 86 is shown schematically in FIG. 4 above. Heater 22 is pushed into bore 24 following arrow A1 shown in FIG. 4. As discussed in relation to FIG. 4, heater 22 and bore 24 have similar geometries such that air is not able to exit bore 24 through an open end (for example, first open end 50A or second open end 50B shown in FIG. 3A).

Step 88 includes evacuating air from bore 24 through vent shaft 28 as heater 22 is inserted into bore 24. Step 88 is also shown schematically in FIG. 4. As shown in FIG. 4, air is evacuated from bore 24 following arrow A2 as heater 22 and epoxy E are inserted into the open end of bore 24 following arrow A1. Heater 22 is inserted completely into bore 24 such that a top end of heater 22 abuts a closed end of bore 24 and a bottom end of heater 22 is inside bore 24, as shown in FIG. 2. Air is evacuated from bore 24 via drain 26 and vent shaft 28. An amount of air may be left in bore 24 determined by a shape of heater 22 (for example, a dimple positioned at a top of heater 22 as a design feature). Air trapped in bore 24 due to a shape of heater 22 is unlikely to push heater 22 out of bore 24 during curing processes. Step 88 is a passive step in that air is forced out of drain 26 and vent shaft 28 as heater 22 is inserted without extra steps, for example, twisting or maneuvering heater 22 or drilling vents through body 20 to bore 24. This reduces the complexity and cost of assembling strut 14.

Step 90 includes curing the adhesive by heating strut 14. Strut 14 can be heated using any reasonable means including a curing oven. Epoxy E and other adhesives can be cured or solidified utilizing heat. Epoxy E can be cured at temperatures around 200° C. After curing, heater 22 is adhered into bore 24 of strut 14 and seated as intended.

Step 92 includes assembling air data sensor 10. Step 92 includes placing each component shown in FIG. 2 inside cavity 30 including sensing device 32 and probe heater 34. Step 92 also includes assembling strut 14 with electronics housing 12. Step 92 can include soldering circuitry and creating other electrical connections necessary to connect air data sensor 10 with other sensing systems in the aircraft.

Method 80 is a method to reduce heater 22 from pushing out of bore 24 during heat curing epoxy E. Method 80 utilizes vent shafts 28 and drains 26 reduces air trapped in bore 24 by heater 22 and epoxy E. Reducing push out of heater 22 reduces reworking and waste associated with assembling strut 14.

This disclosure has described the use of vent shafts (for example, vent shafts 28 and magnet vent shaft 58) and/or drains (for example, drains 26) in relation to two types of sensor components: cartridge heaters (heaters 22) and magnets (magnet 46). However, use of vent shafts and drains in sensors can be used to place other sensor components including thermostats, heaters, magnets, and other sensor components. Further, air data sensor 10 is an ice detector in the context of this disclosure. However air data sensor 10 could alternatively be a pitot probe, a pitot-static probe, a multifunction probe, an angle of attack sensor, or a total air temperature sensor, among other types of sensors for aircraft.

DISCUSSION OF POSSIBLE EMBODIMENTS

The following are non-exclusive descriptions of possible embodiments of the present invention.

An aircraft sensor includes a housing, a strut connected to and extending from a top of the housing, and a probe extending from the strut. The strut includes a flange extending radially outward from a bottom portion of the strut and a body extending from a top of the flange. The strut also includes a bore extending into the strut body and having a closed end positioned in the body. The strut also includes a vent shaft fluidly connected to the bore and including an outlet.

The aircraft sensor of the preceding paragraph can optionally include, additionally and/or alternatively, any one or more of the following features, configurations and/or additional devices:

A further embodiment of the foregoing aircraft sensor, wherein the strut further includes a drain extending between the bore and the vent shaft. The drain fluidly connects the bore and the vent shaft.

A further embodiment of any of the foregoing aircraft sensors, wherein the drain is adjacent to the closed end of the bore.

A further embodiment of any of the foregoing aircraft sensors, wherein the drain and the bore form an angle of between 89° and 91°.

A further embodiment of any of the foregoing aircraft sensors, wherein the drain and the bore form an angle of between 89.5° and 90.5°.

A further embodiment of any of the foregoing aircraft sensors, wherein the vent shaft turns.

A further embodiment of any of the foregoing aircraft sensors, wherein the vent shaft is adjacent to the bore.

A further embodiment of any of the foregoing aircraft sensors, wherein the vent shaft is aligned with the bore.

A further embodiment of any of the foregoing aircraft sensors, wherein the outlet of the vent shaft is positioned through the flange of the strut.

A further embodiment of any of the foregoing aircraft sensors, wherein the body of the strut has a solid, continuous exterior surface.

A further embodiment of any of the foregoing aircraft sensors, wherein the strut body is an airfoil shape.

A further embodiment of any of the foregoing aircraft sensors, wherein the vent shaft has a smaller diameter than the bore.

A further embodiment of any of the foregoing aircraft sensors, wherein the bore is sized to create an air-tight fit around a sensor component.

A further embodiment of any of the foregoing aircraft sensors, wherein the bore and the sensor component are cylindrical.

A further embodiment of any of the foregoing aircraft sensors, wherein the sensing device is positioned in the bore.

A further embodiment of any of the foregoing aircraft sensors, wherein the sensor component is chosen from the group consisting of a heater, a magnet, a thermostat, or combinations thereof.

A further embodiment of any of the foregoing aircraft sensors, wherein the vent shaft is straight.

A further embodiment of any of the foregoing aircraft sensors, wherein the vent shaft is curved.

A method of manufacturing an air data sensor includes additively manufacturing a strut for the air data sensor. The strut comprises a bore and a vent shaft fluidly connected to the bore. The method also includes coating a sensor component with an adhesive. The method also includes positioning the sensor component into the bore. The method also includes evacuating air from the bore through the vent shaft as the sensor component is inserted into the bore. The method also includes curing the adhesive.

The method of the preceding paragraph can optionally include, additionally and/or alternatively, any one or more of the following features, configurations and/or additional devices:

A further embodiment of the foregoing method, wherein the adhesive is an epoxy.

A further embodiment of any of the foregoing methods, wherein curing the adhesive includes heating the strut.

A further embodiment of any of the foregoing methods, wherein the strut further includes a flange extending radially outward from a bottom portion of the strut and a body extending from a top of the flange.

A further embodiment of any of the foregoing methods, wherein the bore extends into the body, has a closed end positioned in the body, and holds the sensor component.

A further embodiment of any of the foregoing methods, wherein the vent shaft fluidly connects to the bore and includes an outlet positioned through the flange.

A further embodiment of any of the foregoing methods, wherein the body of the strut has a solid, continuous exterior surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft sensor comprising:

a housing;

a flange connected to and extending radially outward from a top portion of the housing;

a strut connected to and extending from a top of the flange, wherein the strut comprises:

a body extending from the top of the flange;

a bore extending into the body and having a closed end positioned in the body; and a vent shaft fluidly connected to the bore and including an outlet; and a probe extending from the strut;

wherein the outlet is located on an opposite side of the flange from the closed end of the bore.

2. The aircraft sensor of claim 1, wherein the strut further comprises:

a drain extending between the bore and the vent shaft, wherein the drain fluidly connects the bore and the vent shaft.

3. The aircraft sensor of claim 2, wherein the drain is adjacent to the closed end of the bore.

4. The aircraft sensor of claim 2, wherein the drain and the bore form an angle of between 89° and 91°.

5. The aircraft sensor of claim 1, wherein the vent shaft turns.

6. The aircraft sensor of claim 1, wherein the vent shaft is adjacent to the bore.

7. The aircraft sensor of claim 6, wherein the vent shaft is aligned with the bore.

8. The aircraft sensor of claim 1, wherein the vent shaft is fluidically connected to the closed end of the bore.

9. The aircraft sensor of claim 1, wherein the body of the strut has a solid, continuously closed exterior surface.

10. The aircraft sensor of claim 1, wherein the strut body is an airfoil shape.

11. The aircraft sensor of claim 1, wherein the vent shaft has a smaller diameter than the bore.

12. The aircraft sensor of claim 1, further comprising a component configured to be inserted into the bore to create an air-tight fit with the bore.

13. The aircraft sensor of claim 12, wherein the bore and the component are cylindrical.

14. The aircraft sensor of claim 12, wherein the component is a heater, a magnet, a thermostat, or combinations thereof.

15. The aircraft sensor of claim 1, wherein the vent shaft is straight.

16. The aircraft sensor of claim 1, wherein the vent shaft is curved.

* * * * *